Jan. 3, 1933.  A. McC. PETERS  1,893,242
AUTOMATIC STARTER SWITCH
Filed Feb. 16, 1931   2 Sheets-Sheet 1

Inventor
Arthur M. Peters
By C.A. Snow & Co.
Attorneys.

Jan. 3, 1933.  A. McC. PETERS  1,893,242
AUTOMATIC STARTER SWITCH
Filed Feb. 16, 1931  2 Sheets-Sheet 2
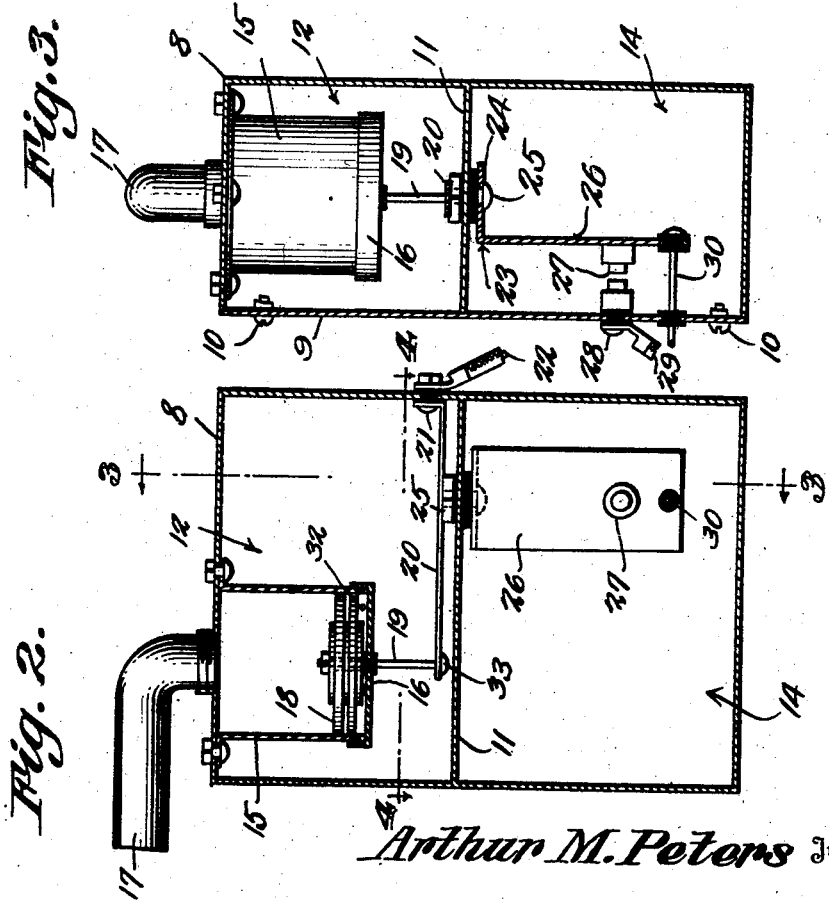
Arthur M. Peters Inventor
By C.A. Snow & Co.
Attorneys Patented Jan. 3, 1933

1,893,242

UNITED STATES PATENT OFFICE

ARTHUR McCLELLEN PETERS, OF NORTH BALTIMORE, OHIO, ASSIGNOR OF ONE-HALF TO JACOB KULP SMITH, OF NORTH BALTIMORE, OHIO

AUTOMATIC STARTER SWITCH

Application filed February 16, 1931. Serial No. 516,266.

This invention aims to provide a means whereby the driver of an automobile can close the starter circuit and put the propelling engine of the automobile into operation when the clutch pedal is worked to shift gears, the starter circuit being opened by piston suction from the engine, as soon as the engine starts to operate by combustion and creates piston suction.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 2 is a vertical section of the switch mechanism;

Figure 3 is a vertical section on the line 3—3 of Figure 2;

Figure 4 is a horizontal section on the line 4—4 of Figure 2.

Figure 1:
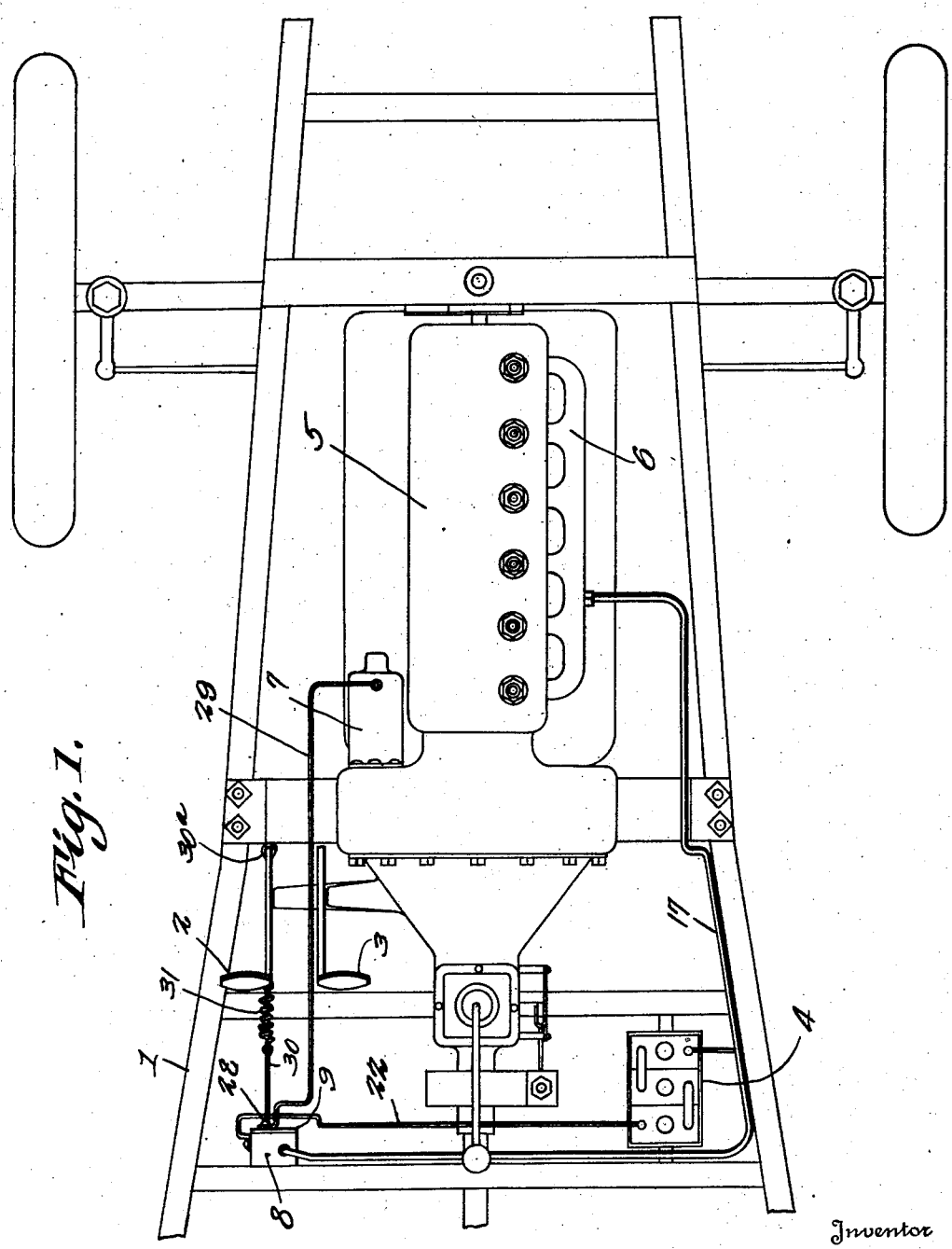
Figure 1 is a top plan showing a portion of an automobile equipped with the device forming the subject matter of this application.

The numeral 1 marks the frame of an automobile, the automobile including a clutch pedal 2, a brake pedal 3, a battery 4 or other source of electrical energy, an internal combustion engine 5 for propelling the vehicle, the engine embodying an intake manifold 6, and the electric starter for the engine being designated by the numeral 7.

In carrying out the invention, there is provided a support 8, in the form of a box-like casing, having a removable door 9 held in place by securing elements 10. The casing 8 is mounted on any accessible portion of the frame 1 of the automobile. Within the casing 8, is secured a horizontal partition 11, dividing the casing into an upper compartment 12 and a lower compartment 14.

A cylinder 15 is located in the upper compartment 12 and is secured to the top of the casing 8. The cylinder 15 is provided at its lower end with a removable head 16. A suction conduit 17 communicates with the intake manifold 6, so that piston suction in the engine 5 can be transmitted to the cylinder 15, the conduit 17 communicating with the cylinder through the top of the casing 8.

In the cylinder 15, a piston 18 is mounted to reciprocate, and the cylinder is provided, below the piston 18 with a vent hole 32 which permits the piston 18 to move quickly downward when there is no suction in the cylinder 15 from the conduit 17. The stem 19 of the piston 18 is slidably mounted in the head 16 of the cylinder 15 and is connected at 33, in any suitable manner, to one end of an approximately horizontal spring switch member 20 having its opposite end connected by a securing device 21 to the casing 8. The securing device 21 holds one end of a conductor 22, the opposite end of the conductor being connected to the battery 4.

In the lower compartment 14 is located an angle bracket 23, the horizontal arm 24 of which is held by a securing device 25 on the partition 11. The securing device 25 constitutes, also, a contact member with which the switch element 20 is adapted to engage. The angle bracket 23 embodies a depending resilient arm 26 which forms a switch member, carrying a contact 27, adapted to engage a securing member 28 mounted on the door 9 of the casing 8. A conductor 29 is held by the securing member 28 and is connected to the starter 7 for the engine 5. A wire 30 or the like is slidably mounted in the door 9 of the casing 8 and is connected to the lower end of the switch arm 26. The wire 30 is joined at 30a by a pull spring 31 to the clutch pedal 2, the parts 30 and 31 forming an operative connection between the clutch pedal and the switch arm 26. The resiliency of the switch arm 26 normally keeps the contact 27 and the securing member or contact 28 spaced apart, as shown in Figure 3.

In the foregoing description, no mention has been made of insulation, because the provision of insulation is a matter lying within the skill of a mechanic.

Suppose that the engine 5 is not running, as may be the case when the engine 5 has stalled with the automobile on a railroad track, or in some other dangerous place. Then there is no suction in the conduit 17 and in the cylinder 15. The piston 18 decends, due either to the weight of the piston, to the resiliency of the spring switch member 20 or to both. The switch member 20 then rests on the securing device 25 and there is established a circuit which is opened by the contact 27 on the switch arm 26, and the contact or securing member 28. This open circuit includes the battery 4, the conductor 22, the securing device 21, the switch member 20, the securing device 25, the arm 24 of the angle bracket 23, the arm or switch member 26, the contact 27, the securing member 28, the conductor 29, and the electric starter 7 for the engine 6.

In order to start the engine 5, it is not necessary for the driver of the car to take his foot off the brake pedal 3, and hold the car with the hand brake, should the car be on a hill, or should it be necessary to hold the car, for any other reason, by brake application. He simply shoves ahead on the clutch pedal 2, and the connection 30—31 actuates the switch arm 26, the spring 31 being provided for the purpose of taking up sudden shocks due to the operation of the clutch pedal. When the switch arm 26 is operated as described, from the clutch pedal 2, the circuit hereinbefore traced out, is closed at 28—27 in Figure 3, the starter 7 is actuated, and the engine 5 is put into operation. As the piston suction builds up in the intake manifold 6, it is transmitted by the conduit 17 to the cylinder 15, and the piston 18 moves upwardly in Figure 2, the spring switch member 20 being drawn upwardly, by the stem 19 of the piston 18, until the switch member 20 no longer bears on the securing device or contact member 25. The circuit for the starter 7 is opened, the starter stops, and the operator can take as much time as he wishes to shift gears. When the clutch pedal 2 no longer is pushed forwardly, the circuit for the starter 7 is opened at 27—28 in Figure 3. When the engine 5 ceases to run, and when there is no piston suction in the conduit 17, the piston 18 moves downwardly, the switch member 20 closing the circuit 26, 25, and the switch parts, generally considered, restored to the positions shown in Figures 2 and 3.

Although the description of the operation of the device is of some length, it may be stated that, in practice, the putting of the starter 7 into operation, and stopping the operation of the starter, call for no effort on the part of the driver, other than shoving forwardly on the clutch pedal 2.

Having thus described the invention, what is claimed is:

In a device of the class described, a support, a first switch carried by the support, a cylinder carried by the support, a piston operating in the cylinder, suction means connected to the cylinder for moving the piston, means for connecting the piston to the first switch mechanically, a second switch, means under the control of an operator for actuating the second switch, and a securing element connecting the second switch to the support, the securing element forming a contact terminal for the first switch and establishing a circuit through both switches when they are closed.

In testimony that I claim the foregoing as my own, I have hereto affixed my signature.

ARTHUR McCLELLEN PETERS.